March 10, 1964

L. I. SHURE 3,124,689

ISOTOPE CAMERA

Filed Sept. 14, 1959

INVENTOR.
LLOYD I. SHURE

BY *Pyle and Fisher*

ATTORNEYS

March 10, 1964

L. I. SHURE 3,124,689

ISOTOPE CAMERA

Filed Sept. 14, 1959

INVENTOR.
LLOYD I. SHURE

BY *Pyle and Fisher*

ATTORNEYS

March 10, 1964          L. I. SHURE                    3,124,689
                      ISOTOPE CAMERA
Filed Sept. 14, 1959                              3 Sheets-Sheet 3

INVENTOR
LLOYD I. SHURE

BY Pyle and Fisher

ATTORNEYS

United States Patent Office 3,124,689
Patented Mar. 10, 1964

3,124,689
ISOTOPE CAMERA
Lloyd I. Shure, Willowick, Ohio, assignor to Picker X-Ray Corporation, Waite Mfg. Division, Inc.
Filed Sept. 14, 1959, Ser. No. 839,734
27 Claims. (Cl. 250—106)

This invention pertains to radiant energy devices and more particularly to a radiant energy camera for photographing the internal structure of an object.

In the past, many proposals have been made for the inspection of metallic articles for cracks or other flaws. These proposals are broadly referred to as flaw detection apparatuses. Flaw detection apparatuses include mechanism which utilize such well known techniques as: (1) strain measurement; (2) measurement of electrical resistance; (3) magnetic inspection where a magnetic field is used to cause paramagnetic particles to collect around the flaws; (4) penetrants which carry a quantity of die to permit visual location of surface flaws; (5) fluoroscopic inspection; and (6) X-rays photographs.

With all of the listed techniques there are definite drawbacks if inspection is to be conducted in the "field." Such inspection problems as pipeline welds and building frameworks require a portable compact unit which can be operated under conditions where space is limited. For this type of inspection prior proposals have all had definite shortcomings. Strain measurement and magnetic inspection both require specialized apparatus that cannot readily be reduced to a compact portable unit. Both of these techniques are best suited for inspection of small parts. Electrical resistance measurements are often combined with a strain-testing technique. The problem with electrical resistance is that variables other than flaws can effect the flow of current. Therefore, the practical usefulness of this technique is normally limited to determining whether or not a large flaw exists. Some supplemental test is usually used to locate the flaw.

Penetrants only detect surface flaws. Thus, in pipe inspection one would be required to use a specialized apparatus insertable from one end of a pipe, as well as external inspection just to find all surface flaws. The penetrant and fluoroscopic systems both require substantial space for visual inspection.

Fuoroscopic and X-ray apparatus require a substantial source of electrical energy. These apparatuses are often large for portable use and limited by heavy, well shielded, cables. In recent years, some inspection has been done with a technique similar to X-ray inspection utilizing some radioactive isotope as the film exposure beam energy source. Prior mechanisms utilizing such isotopes have usually been cumbersome and bulky because of the heavy shielding required and the intricate shuttering mechanisms used to shift the radioactive material from a storage to an exposure position and return. Further prior mechanisms for shifting this material from storage to exposure and return have not always been foolproof.

The mechanism of this invention is a device known as a portable camera. This camera overcomes all of the listed disadvantages of prior proposals and others as well. Thus, this camera is primarily suited for such industrial applications as inspecting a weld which joins two pipe sections in end-to-end relationship. In its preferred form it is a self-contained mechanism which includes a quantity of radioactive material as the source of radiant energy. It also includes a simple foolproof shutter means for selectively permitting or preventing the emission of a film-exposing radiant-energy beam.

The camera of this invention includes a shield which contains the quantity of radioactive material. The material is carried by a rotatable support, which support is in turn carried by a rotatable shaft. The support is disposed within a cavity in the shield and the shaft is journaled in a bore in the shield. The shaft extends from the shield cavity to the exterior of the shield.

The shield includes a window which is pervious to radiant-energy beams. The window forms the camera exposure opening. The shaft is rotatable to shift the radioactive material from a safe or storage position in the center of the shield to an exposure position adjacent the window.

The rotation of the shaft and material support is normally accomplished by an energy-retention device such as a coiled spring. A means is provided to wind the spring and tension it for one complete photographic sequence. The sequence includes movement of the radioactive material from the safe position to the exposure position and return. The mechanism also includes a manual overriding drive assembly which permits the radioactive material to be shifted from the exposure to the storage position manually in the event of a failure of the remotely-controllable drive mechanism.

A cam and detent mechanism is operably connected to the shaft to index the shaft into the exposure and storage positions respectively. The detent is controlled by a solenoid. The solenoid, in turn, is remotely actuated by a battery-energized circuit. A safety mechanism such as a micro switch is provided to prevent the remote actuation of the drive mechanism unless the coiled spring is fully and tightly wound.

A dial crank and a second or dial shaft are provided to wind the spring. The spring is connected to the second shaft and the shaft in turn is urged into operative engagement with the first or shutter shaft by a suitable means such as a second spring. The operative engagement between the shafts is accomplished through a dog and notch arrangement between the dial shaft and the shutter shaft.

When the cam is in its storage position and the detent disposed in a cam notch, the cam will not rotate. This prevents rotation of the attached shutter shaft. With the mechanism in this position, the dial shaft can be reverse-rotated by rotation of the dial crank for 360°. This provides the appropriate tensioning of the coil spring. Since the cam cannot rotate the dog and notch mechanism lifts out of engagement against the action of the second spring. The dogs and notches are urged back into engagement by the second spring when the 360° rotation has been completed.

When the cam is in the exposure position, the detent prevents rotation in only one direction. This permits the cam to be reverse rotated by rotation of the manual overriding drive to shift the connected shutter shaft and the connected material support, such as a shutter wheel, from the exposure to the storage position.

Accordingly, one of the principal objects of the invention is to provide a novel and improved portable self-energized radiant-energy camera.

A related object of this invention is to provide a mechanism made in accordance with the preceeding object which mechanism is remotely controllable for film exposure.

A more special object of this invention is to provide such a remotely controlled member which includes an actuation mechanism in the form of a solenoid controlled detent and a battery activated solenoid actuation circuit.

An associated object of the invention is to provide a pair of cam actuated micro switches for breaking such solenoid circuit immediately after the rotating shutter and shaft have been released by the detent.

An additional object of this invention is to provide a novel and improved camera employing a radioactive material as a radiant energy source which includes an automatic timer shutter and a manually actuated shutter switch to permit either manual or automatic exposure timing.

Another object of this invention is to provide a drive means to shift a quantity of radioactive material from a storage to an exposure position and return which drive means includes an energy storing means.

A more special object of this invention is to provide energy storing means in the form of a tensionable coil spring.

A further object of this invention is to provide a remotely controllable radiant energy camera which includes an operator controlled manual overriding mechanism for return of the mechanism to the storage position in the event of failure of the remotely controlled drive means.

A similar object of this invention is to provide an overriding mechanism in the form of a cam which is held against rotation when in the storage position and which is rotatable in one direction only when in the exposure position, an energizing drive shaft and an operable connection between the drive shaft and the shutter shaft in the form of a spring-urged-dog-and-notch combination. According to this object the dog and notch arrangement comes out of engagement on reverse rotation of shutter shaft when the cam is in the storage position and remains in engagement when the cam is in the exposure position.

Another more special object of this invention is to provide a remotely controlled mechanism which includes a safety micro switch to prevent actuation of the mechanism at all times other than when it is fully prepared for an exposure sequence.

A further more specialized object of the invention is to provide a dial crank for energizing the coil spring drive.

An additional object of this invention is to provide a novel and improved radiant energy mechanism which is rotatable 180° from a storage position to an exposure position and 180° in the same direction of rotation to return the source material to the storage position by a full 360°.

Yet another object of this invention is to provide a compact, lightweight mechanism wherein the compactness is enhanced by providing a shutter wheel secured to the end of a rotatable shaft and positioning the exposure window adjacent the wheel and along a path which is substantially radial with respect to the shaft axis of rotation.

Still another object of this invention is to provide a quantity of radioactive material contained in a hermetically sealed radioactive capsule to form a pellet and wherein the pellet is frictionally and removably carried in a slotted aperture formed in the material support and held in position by a snap ring.

A related object of this invention is to provide a novel and improved sectioned shield which may be easily dismantled for replacement of the radioactive pellet.

An associated object of this invention is to provide a sectioned shield which includes clamping means to force the shield sections together.

A further, specialized, object of this invention is to provide a beam aperture which is conical in shape to permit the camera to be disposed at one side of a wall or the like such that the radiant-energy beam will be projected through pipe or the like to that portion of the weld on the opposite side of the pipe or other object on which the camera is supported.

Still another specialized object of this invention is to provide a shutter shaft of a tensile material, which shaft has a bottomed bore extending axially from the shutter end of the shaft and which bore is filled with a shielding material.

Other objects and a fuller understanding of the invention may be had by referring to the following description and claims taken in conjunction with the accompanying drawings, in which:

FIGURE 1 is a perspective view of the novel and improved camera positioned on a pipe for testing a pipe weld or the like;

Figure 1:
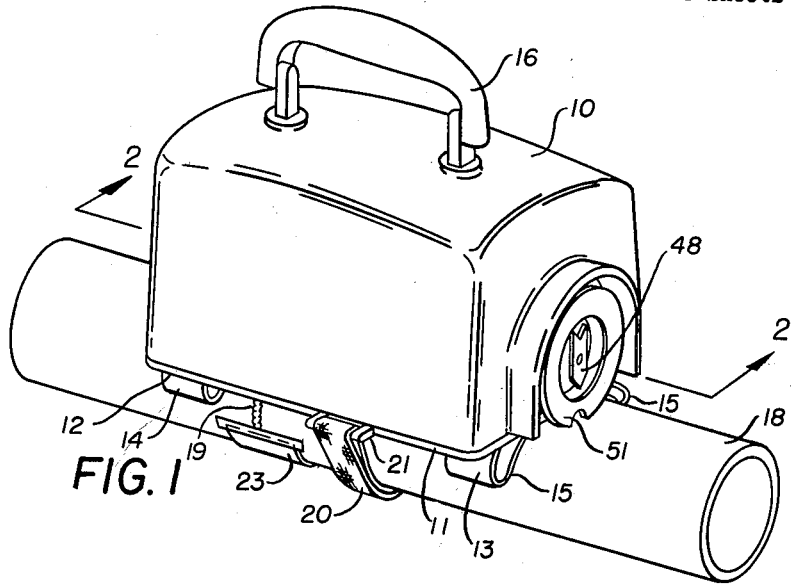
Figure 2:
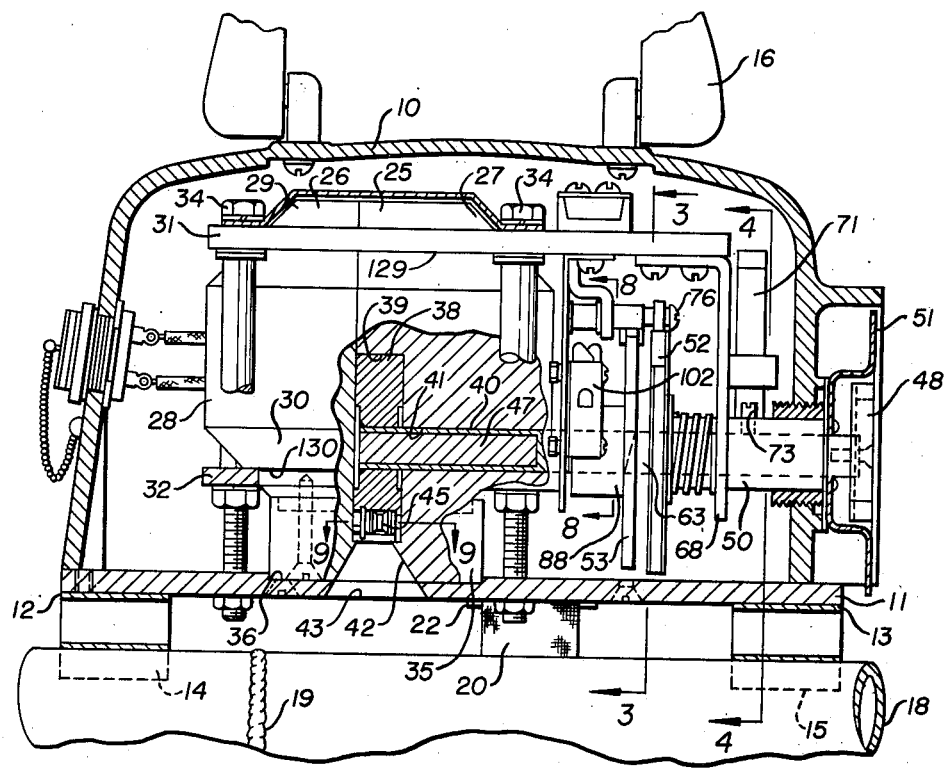
FIGURE 2 is a view of the device of FIGURE 1 on an enlarged scale with respect to FIGURE 1 showing the internal structure of the device and with parts broken away to show portions of the structure in cross section as seen from a longitudinally extending vertical plane of cross section.

In FIGURES 1 and 2 of the drawings, a camera housing is shown at 10. The housing 10 includes a base portion 11 which serves both as part of the enclosing housing 10 and as a part of the frame structure of the mechanism.

A pair of supporting and locating springs 12, 13 are provided. The springs 12, 13 include inwardly bent end portions 14, 15, respectively. In each case there are two inwardly bent end portions, one of the portions 14 being visible in FIGURE 1 and the other of the portions 14 being visible in FIGURE 2. The mechanism also includes a suitable carrying handle 16 for transporting the portable camera to a desired location.

In FIGURES 1 and 2 the camera is shown positioned on a pipe 18. The pipe 18 includes a weld 19. The camera is positioned to test the weld by photographing the internal structure of it. The camera is appropriately located on the pipe by the actions of the inwardly bent support spring ends 14, 15 which are designed to accommodate pipes of a wide range of sizes. The camera is held in position on the pipe by a strap 20 which engages a pair of eyes 21 (FIGURE 1), 22 (FIGURE 2) fixed to the housing base portion 11.

A sheet of X-ray film is positioned inside a suitable light impervious member 23. The member 23 is positioned on the pipe on a side opposite the camera so that rays pass through the pipe to photograph the portion of the weld which is remote from the camera. Two or three exposures are necessary to photograph an entire weld.

A shield 25 is carried in the housing. Since the preferred radioactive material is a radioactive isotope of iridium which has a relatively short half life, and since it may be desirable to repair the mechanism contained within the shield 25, the shield is formed in a plurality of easily separated sections, two of which are identified by the numerals 26, 27. These sections together form the shield 25 which is preferably cylindrically contoured. The shield also has upper and lower tapered portions 29, 30 which are preferably frusto-conically shaped. The tapered portions 29, 30 have annular notches 129, 130 formed therein.

Upper and lower apertured camming plates 31, 32 are positioned around the upper and lower tapered portions 29, 30. A plurality of clamping bolts 34 are provided to selectively force the camming plates 31, 32 toward one another and into the annular notches 129, 130. This action wedges the shield sections 26, 27 together in a faired fit to form a unitary shield.

The clamping bolts 34 also extend through the housing base plate 11 to serve as a mounting structure and form a part of the frame. This is accomplished by pulling the camming plates 31, 32 and the included shield down against a shield window portion 35. The shield window portion 35 is preferably cylindrically contoured and it is seated in a recess 36 in the housing base portion 11.

A cylindrically contoured rotatable shutter wheel 38 is positioned in a closely fitting cavity 39 in the shield 25. The shutter wheel 38 is carried at one end of a shutter shaft 40. The shutter shaft 40 is journaled in a bore 41 which is formed in the shield. The bore 41 communicates with the cavity 39.

The cavity 39 is disposed symmetrically about the vertical axis of the shield 25. The cavity 39 is longitudinally offset toward the lower end of the shield. The cavity 39 communicates with a frusto-conical shaped passage 42 formed in the window portion 35 of the shield. The passage 42 forms a part of an X-ray window which is pervious to a radiant-energy beam. In its disclosed form, the window also includes a thin metal portion 43 in the housing base 11. The window passage 42 is displaced from the weld so that the film, when exposed, will show only the weld adjacent the film and none of the weld in the area adjacent the camera.

Figure 9:
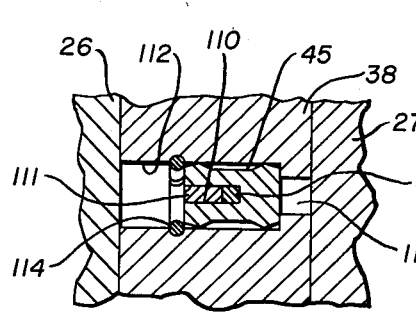
FIGURE 9 is an enlarged sectional view of the active material retaining capsule.

The shutter wheel 38 supports a capsule 45 in a position which is eccentric with respect to the axis of shutter rotation. The capsule 45 carries a quantity of radioactive material which is shown in FIGURE 9 and designated there by the numeral 46. The capsule 45 fits into a void in the shutter wheel 38 and is carried by the wheel in a fashion which will subsequently be described in more detail.

The shutter wheel and the connective shaft have an exposure position shown in FIGURE 2. When the wheel and shaft are in the exposure position, the capsule 45 is adjacent the window passage 42. The shutter and wheel also have a storage position 180° from the exposure position. In the storage position, the capsule 45 is positioned at substantially the geometric midpoint of the shield 25.

The shutter wheel and connected shaft are endlessly rotatable in either direction to facilitate shifting from the storage to the exposure position and vice versa. This shifting from one position to another will also be described in more detail below.

One of the outstanding advantages of the invention is that the wheel 38 and the shaft 40 contribute to the shielding of the material 45 when in the storage or safe position. The shield in the preferred and disclosed arrangement substantially surrounds the shutter wheel and is always on at least three sides of the active material. With this construction a very compact and highly efficient mechanism is provided which limits the weight of the mechanism to a minimum.

Another feature of the invention which contributes to he compact shielding is the novel shutter shaft. The shaft 40 is formed from a strong tensile material such as stainless steel. The inner or shutter end of the shaft is bored out and filled at 47 with a suitable shielding material such as tungsten. Tunsten is preferred both for the bore filling at 47 and for the shield 25 because of its heavy density and relatively light weight. The shutter wheel 38 is also preferably formed from tungsten.

The shaft 40 extends from the cavity 39 through the mechanism to the exterior of the housing 10. A condition indicating arrow 48 is carried on the end of the shaft 40. The arrow 48 points in the direction of the capsule 45 to indicate whether it is in the storage position, the exposure position, or some intermediate location. This arrow 48 also serves as a manual overriding drive lever. Rotation of the arrow 48 manually rotates the wheel 38 through the direct connection of the inner shaft 40. This manual return rotates the shutter in a direction opposite that of driven rotation under the urging of the spring 52.

A second or outer shaft 50 is telescoped over the shutter shaft 40. The outer shaft 50 has a dial crank 51 connected to its outer end. The dial crank and outer shaft together form an operator adjustable means to tension a force providing means in the form of a coil spring 52. The spring 52 has one end fixed to the frame at 76 and the other end fixed to the other shaft 50 at 77.

A notched position locating cam 53 is fixed to the shutter shaft 50. The notched cam 53 has a safe position notch 54 and an exposure position notch 55. A notch engaging detent 56 is pivotally mounted on a suitable bracket 57. The detent 56 is urged against the cam 53 by a spring 58. Thus, the cam and detent together provide an indexing control means to index the shutter into a desired location.

A solenoid 59 is provided which has a core extension arm 60 which is connected to the detent lever 56. Actuation of the solenoid 59 will pivot the detent lever 56 against the action of the spring 58 and out of engagement with the cam 53. The details of the solenoid and the remainder of a suitable actuation means will be described in further detail below.

The outer shaft 50 has a cam engaging end 63. The cam engaging end 63 includes a pair of tapered dogs 64, 65. The dogs 64, 65 normally project into a pair of dog receiving notches 66, 67 formed in the cam 53 to provide an operative connection between the drive means and the shutter. A frame section 68 is secured to the upper apertured camming plate 51. The frame section 68 is apertured to receive the shafts 40, 50. A locating spring 69 is positioned around the shaft 50 and between the frame section 68 and the coil spring 52. The locating spring 59 urges the coil spring 52, the connected shaft 50, and its included cam end 63 against the cam 53. This forces the dogs 64, 65 into the corresponding notches 66, 67 when they are in alignment.

Figure 3:
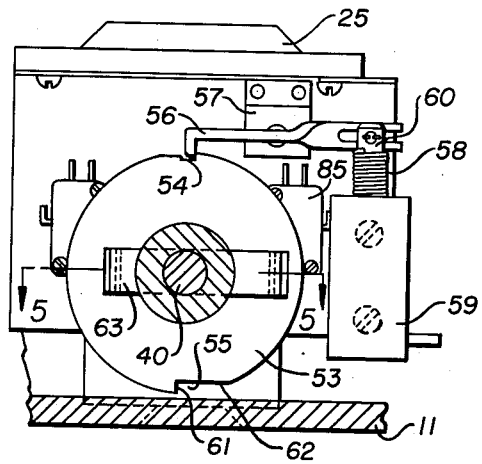
FIGURE 3 is a sectional view of a reduced scale with respect to FIGURE 2 and as seen from the plane indicated by the line 3—3 of FIGURE 2 showing a control cam in plan view.
Figure 5:
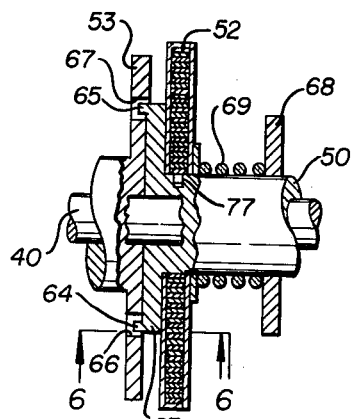
FIGURE 5 is an enlarged fragmentary sectional view of the drive means as seen from the plane indicated by the line 5—5 of FIGURE 3.
Figure 6:
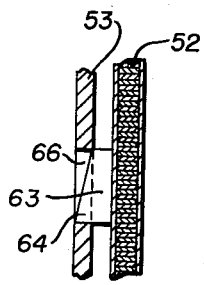
FIGURE 6 is a fragmentary sectional view of the dog and cam arrangement as seen from the plane indicated by the line 6—6 of FIGURE 5.

When the detent 56 is disposed in the safe notch 54 of the cam 53, the cam 53 cannot rotate. This is the position shown in FIGURE 3. With the detent engaging the notch 54, the dial crank 51 may be rotated clockwise. This will rotate the connected outer shaft 50 relative to the inner shaft and the connected cam 53. The tapered end surfaces of the dogs 64, 65 will coact with the ends of the notches 66, 67 with a cam-like action to urge the dogs and the connected parts axially to the right as seen in FIGURE 5. Continued clockwise rotation of the dial crank 51 and the connected outer shaft 50 will tension the coil spring 52. After 180° of rotation have been completed it will be seen that the dogs will not engage the dog notches. The dog 65 and its companion notch 67 are offset radially a different distance from the axis of rotation than are the dogs 64 and the associated notch 66. This difference in radial offset prevents dog-and-notch engagement after 180° of rotation. Thus, it is necessary that a complete 360° rotation be accomplished before there is re-engagement of the dogs and notches. If the rotation is anything short of 360°, the spring will unwind itself. Thus, complete tensioning of the coil spring is assured.

As a further safeguard to guarantee complete tensioning before the device can be operated, a safety micro switch 70 is provided. A switch closing pivot 71 is pivotally mounted on the frame at 72. A pivot-actuating dog or projection 73 is threaded into the outer shaft 50 to shift the pivot 71 to a desired position. A position locating stop 74 straddles the pivot 71 to index it into an appropriate position.

Figure 4:
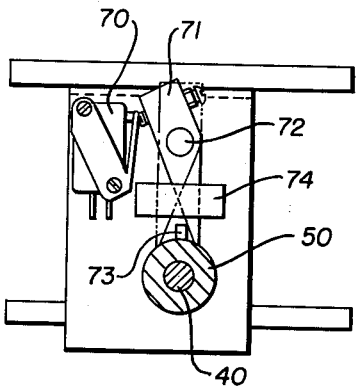
FIGURE 4 is a fragmentary sectional view of the device as seen from the plane indicated by the line 4—4 of FIGURE 2 and on the scale of FIGURE 3.

When the spring 52 is in an unwound condition, the pivot 71 is in the position shown in phantom in FIGURE 4. Rotation of 360° in a clockwise direction causes the pivot actuation projection or pin 73 to strike the other side of the pivot 71 and shift it to the position shown in FIGURE 4 in bold lines. The coaction of the pivot and stop serves to prevent overriding of the spring 52. This coaction also closes the micro switch 70 to permit the actuation circuit to be activated. When the mechanism is actuated the coaction of the pivot 71 and the pin 73 prevents rotation substantially in axes of 360° and thereby prevents excessive unwinding of the spring 52.

As has been noted, clockwise rotation of the dial crank when the detent is in engagement with the storage notch 54 will tension the coil spring 52. The coil spring when so tensioned has sufficient retained energy to drive the shutter through 360° of unidirectional counter-clockwise rotation. This driven rotation will normally be in increments of 180° from the storage to the exposure position and thence from exposure to storage.

If the cam 53 is in the exposure position with the detent 56 in engagement with the exposure notch 55, it is possible to return the shutter to its storage position manually. As previously indicated, this manual return is accomplished by rotating the arrow 48 180° in a clockwise direction. It is also possible to rotate the shutter manually in a counter-clockwise direction.

This counterclockwise manual rotation can be obtained either by first actuating the solenoid or otherwise lifting the detent or when the mechanism is jammed or for some other reason disposed at a location between the exposure and safe positions. Thus, the advantage of a self-contained unit with a remotely controllable shutter is obtained while manual return to guard against some mechanical failure is also provided.

CONTROL CIRCUIT

In keeping with a portable remotely usable principle, the self-contained and simple control circuit is provided. This self-contained circuit includes an energy retention means in the form of a battery 80 which actuates the mechanism. The battery 80 is connected through a suitable conductor 81 to the solenoid 58. A switching circuit shown generally at 82 is connected to the conductors 83, 84. The conductors 83, 84 complete a series circuit between the battery 80 and the solenoid 58.

The switching circuit includes a single-pole, double-throw micro switch 85 which includes contacts 86, 87. The micro switch 85 is actuated by a cam switch portion 88 which is a part of the cam 53.

The single-pole, double-throw micro switch 85 may be referred to as a shutter control micro switch. The shutter control micro switch 85 connects the contact 87 with the solenoid 58 when the cam switch portion 88 urges it into that position. This urging occurs when the shutter is in the safe or storage position. The contact 87 is series connected to the safety micro switch 70 by a conductor 89. The safety micro switch 70 is in turn connected through a conductor 90 to a contact 91 of a single-pole, double-throw timer switch 92.

The contact 91 is connected through a conductor 93 to one contact 94 of a manually actuated single-pole, double-throw switch 95. If the manual switch 95 is connected to the contact 94, the mechanism may be operated with manual timing by shifting the throw from the contact 94 to opposite contact 96 of the manual switch 95. The contact 96 may also be referred to as a timer contact. This latter statement is true because with the manual switch 95 connected to the timer contact 96, the timer swich 92 may be used to automatically control the exposure. An on-off switch 97 controls the entire circuit.

EXPOSURE OPERATIONS

A. *Automatic*

Figure 7:
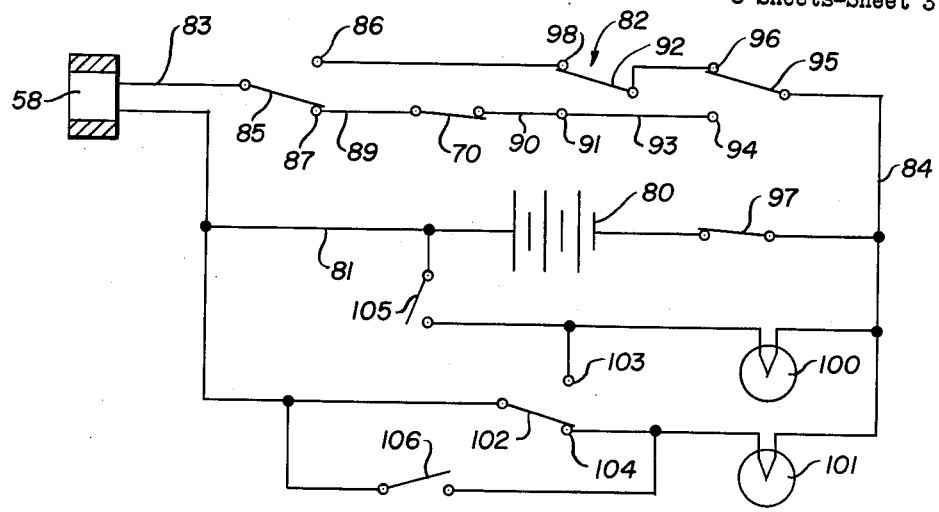
FIGURE 7 is a wiring diagram of the electric control circuit.

To conduct an automatically timed exposure the dial crank 51 is first rotated 360° to wind the spring 52 and to shift the safety and control micro switch 70, 85 to the position shown in FIGURE 7. The on-off switch 97 is then closed as shown in the drawings. The manual switch 95 is placed in the timer position which is also the position shown in FIGURE 7. The timer switch 72 is then set. Actuating of the timer switch shifts its throw from engagement with "off" contact 93, the position shown in FIGURE 7, to engagement with the contact 91, which may be referred to as a starting or exposure contact.

The engagement of the throw of the timer switch 92 with the exposure contact 91 will close a circuit between the battery 80 and the solenoid 58. This circuit is from the battery 80 through the conductor 81 and the solenoid 58, thence through the conductor 83, the control micro switch 85 and its contact 87, and thence through the conductor 89, the closed safety micro switch 70, the conductor 90 to the contact 91 and thereafter through the remainder of the timer switch 92 to the manual contact 96, of the manual switch 95 thence through the conductor 84 and the on-off switch 97 and back to the battery. As soon as this circuit is closed the solenoid is actuated and it will lift the detent 56 out of the notch 54. This disengagement of the detent and cam permits the spring 52 to rotate the cam 53 and the connected shafts in a counter-clockwise direction. Immediately after rotation starts the rotation of the cam switch portion 88 permits the throw of the micro switch 85 to shift from the contact 87 to the contact 86 breaking the switching circuit and thereby deactivating the solenoid.

It should also be noted that this movement opens the safety micro switch 70 which then remains open until the spring 52 is again rewound as has been described above. As soon as the solenoid is de-energized, the solenoid or detent spring 58 will urge the detent 56 against the surface of the cam 53 to cause the detent to engage the exposure notch 55 when they become aligned.

The entire mechanism will remain in the exposure position until the timer switch 92 automatically shifts its throw to engage the "off" or terminating contact 98. This again actuates the solenoid to lift the detent. This latter solenoid actuation is from the battery 80 through the conductor 81 and the solenoid 58 to the conductor 83 and thence through contact 86 of the selection micro switch 85, the terminating contact 98 and the remainder of the timer switch 92 and thence through the remainder of the switching circuit which is unchanged, back to the battery 80.

B. *Manual*

Analysis of FIGURE 7 will show that manual actuation of the mechanism can also be readily obtained. Starting with the switches in the position shown in FIGURE 7, for manual actuation, one shifts the throw of the manual switch 95 from engagement with the timer contact 96 to engagement with the manual contact 94. This movement has the same effect as setting the timer. Thus, the circuit through the solenoid 58 will be closed to cause the mechanism to rotate from the storage to the exposure position. At a desired time the manual switch may be returned to engagement with the timer contact 96. This again closes the solenoid to return the mechanism from the exposure to the storage position.

CONDITION INDICATIONS

When the detent 56 is lifted out of engagement with one of the cam notches 54, 55 the entire connected mechanism driven by the spring 52 will rotate 180°. The rotating mechanism includes the shutter wheel 38 and the supported capsule 45. It also includes the shafts 40, 50 and the various parts connected to them, including the dial crank 51 and the indicating arrow 48. Thus, the indicating arrow 48 always points in the direction of the capsule from the axis of rotation.

Figure 8:
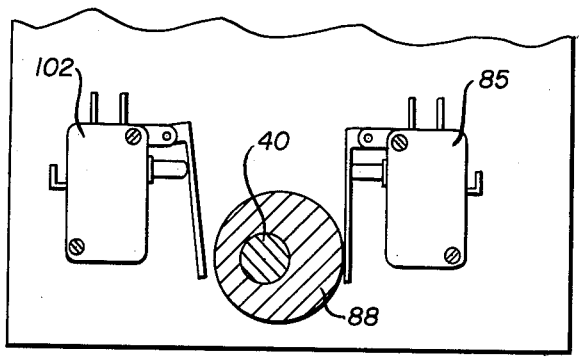
FIGURE 8 is an enlarged fragmentary sectional view of the device as seen from the plane indicated by the line 8—8 of FIGURE 2.

As an additional and remote indication of the condition, a pair of condition-indicating lamps 100, 101 are provided, FIGURE 7. A single-pole, double-throw condition indicating micro switch 102 is provided. The switch 102 has an exposure contact 103 connected to the exposure condition bulb 100 and a safe condition contact 104 connected to the safe condition bulb 101. The condition indicating micro switch 102 is actuated by the cam switch portion 88. When the cam switch portion 88 engages the switch 102, the throw is shifted from engagement with the contact 104 to engagement with the contact 103. Thus, when the switch is in the position shown in the FIGURE 8, the lamp 101 will light, and when the mechanism has rotated to exposure position, the lamp 100 will light.

"Push to test means" are provided. In the drawings, the "push to test means" takes the form of switches 105, 106 which by-pass the switch 102 electrically. The switches 105, 106 may be closed to test the lamps 100, 101 respectively. Alternately, the well-known "push to test" type of socket may be substituted so that one merely pushes down on the lamp to be tested.

REPLACEMENT OF ACTIVE MATERIAL

Another of the outstanding advantages of the invention is the novel and improved arrangement for facile replacement of the radioactive material 46. The material 46 is carried in a capsule bore 110 which is formed in the capsule 45. The bore 110 is closed by a suitable capsule plug 111. Preferably, the capsule 45 and the plug 111 are aluminum or some other material which is equally pervious to radiant energy radiation of the type emitted by a radioactive material.

The capsule 45, the material 46, and the plug 111 form a pellet which is carried in a void in the shutter which void is defined by walls 112. A longitudinally extending slot 113 communicates with the remainder of the void, so that the side walls 112 are somewhat C-shaped in cross section. The slot 113 facilitates the ready removal and replacement of the pellet with a suitable tool. A snap ring 114 holds the pellet in the void.

While the mechanism has been described with a great deal of detail it is believed that it essentially comprises a portable radiant energy camera in which a rotatable shutter is provided along with means for remotely controlled driven actuation and means for manual rotation as well.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A radiant-energy camera comprising a frame structure, an active material support journaled in the frame, a quantity of radioactive material eccentrically carried by the support, a radiant energy shield means surrounding the material and at least a substantial portion of the support, the shield means having a portion defining a window for an energy beam, the active material having storage and exposure positions, a spring operatively connected to the support to rotate the support and the active material from each position to the other of the positions, an operator driven means connected to the spring for selective pretensioning of the spring independent of and prior to rotation of the support, and control means for selectively actuating and terminating rotation of the support by the drive means.

2. A radiant-energy camera comprising a frame structure, an active material support journaled in the frame, a quantity of radioactive material eccentrically carried by the support, a shield surrounding the material and having a portion defining a path for an energy beam, the active material having storage and exposure positions, manually energized drive means operatively connected to the support to rotate the support and the active material to the exposure and to the storage positions, control means for selectively actuating and terminating rotation of the support by the drive means, and energy retention means connected to said control means for energizing the control means.

3. In a radiant energy flaw detection device the improvement which comprises, a shield member having a cavity therein, a frame structure, an active material support rotatively carried by the frame structure and at least partially disposed in the shield cavity, said support including a shaft projecting from said cavity to receive a rotative force, a quantity of radiant energy emitting material eccentrically carried by the support, said shield including an energy transmitting exposure portion, said support having exposure and storage positions, said material being adjacent said exposure portion when the support is in the exposure position, said support being rotatable about 180 degrees from the storage position to the exposure position and about 180 degrees in the same direction from the exposure position to the storage position, unidirectional drive means connected to the shaft to rotate the support from its storage position to its exposure position and thereafter to rotate the support in the same direction from the exposure position to the storage position, and manually actuatable control means operably connected to the drive means for selectively causing the drive means to rotate the support from the storage position to the exposure position and thereafter selectively causing the support to rotate from the exposure position to the storage position.

4. In a radiant-energy camera utilizing a radioactive material carried in a rotatable shutter member the improvement which comprises, a frame, a shaft journaled in the frame and connected to such shutter, shaft drive means carried by the frame, means to form an operative connection between the drive means and the shaft, said drive means including a spring operably connectable to said shaft through said operative engagement means, operator driven means connectable to said drive means to tension said spring independent of said shutter rotation, a cam operably connected to the shaft and having at least one rotation control notch, rotation control means operatively connected to the cam through said notch, and means to selectively disengage the rotation control means and the cam and permit the spring to rotate the shutter.

5. The device of claim 4 wherein the cam is a first rotatable member which has an engagement section and wherein a second coacting rotatable member is provided and connected to said drive means and wherein the operative engagement means comprises at least one dog formed on one of the members and a corresponding dog receiving notch formed in the other of the members to receive and engage the dog, means to urge the dog into engagement with the notch, and wherein the members are rotatable together when there is dog and notch engagement.

6. The device of claim 4 wherein the cam is a first member which has an engagement section and wherein a second coacting member is provided and connected to said drive means and wherein the operative engagement means comprises a plurality of dogs formed on the members and a corresponding number of dog receiving notches formed in the members to receive and engage a corresponding dog, the dogs and notches being matched in pairs with one of each pair being on each member, and means to urge each such dog into engagement with the paired notch.

7. The device of claim 6 wherein the dogs are formed on one of the members and the notches are formed in the other.

8. In a radiant-energy camera utilizing a radioactive material carried in a rotatable shutter member the improvement which comprises, a frame, a first shaft journaled in the frame and connected to such shutter, a second shaft journaled in the frame and disposed in concentric relationship with the first shaft, a coil spring having a first end secured to the frame and a second end connected to the second shaft, a cam connected to the first shaft and having a pair of rotation control notches, the notches being storage and exposure position notches, a detent carried by the frame, a spring urging the detent against the cam, the detent being engageable with said notches to index the shutter into storage and exposure positions, a solenoid positioned to selectively lift said detent against the spring and away from the cam, first and second dogs carried by the second shaft, the cam including first and second dog engaging portions engageable with said first and second dogs respectively and only, a spring interposed between the second shaft and the frame to urge the first and second dogs into engagement with the first and second dog engaging portions respectively, operator actuatable means to cause reverse relative rotation of the shafts to disengage the dogs and notches and to tension said coil spring when the detent is in the storage position notch to hold the cam in position, and means to selectively actuate the solenoid and lift said detent to permit the coil spring to cause relative rotation of the shafts.

9. The device of claim 1 wherein the control means includes a solenoid and a control switch connected through a circuit to a source of electrical energy, wherein a switch means normally opens the circuit between the source of electric energy and the solenoid, and wherein the drive means includes means coactable with the switch means when the spring is tensioned to close said circuit when the control switch is closed thereby actuating the solenoid.

10. The device of claim 9 wherein a cam-actuated switch breaks said circuit immediately after the support rotation commences.

11. The device of claim 4 wherein a micro-switch is carried on the frame and connected to the control means and wherein the drive means includes a switch actuating dog coactable with the micro-switch to close the switch and permit the selective actuation means to actuate the control means.

12. The device of claim 4 wherein said spring is a coil spring and wherein the operator driven means is a dial crank.

13. In a radiant energy device the improvement which comprises a plurality of interfitting sections connectable together to form a ray energy shutter shield, at least one of the sections having a cavity formed therein, the shield including a shaft receiving bore extending from the cavity to the exterior thereof, the shield having spaced camming surfaces formed on the exterior thereof, first and second clamping members coactable with said camming surfaces, and clamping means connected to the members to force the members against the camming surfaces and thereby connect the sections together to form said shield.

14. A radiant energy camera comprising a frame structure, a sectioned shield carried by the frame, the shield having a generally cylindrical center portion and spaced oppositely tapered portions on either side of the center portion, the frame including first and second relatively movable apertured plates, each of the plates being positioned around one of said tapered surfaces, clamping means to urge said plates toward one another to cam the shield sections against one another and form a closed shield, said shield having a cylindrically contoured shutter cavity formed therein and disposed symmetrically about the axis of the shield, the shield also including a ray energy window disposed around the shield axis at one end of the shield, the shutter cavity being offset with respect to the longitudinal midpoint of the shield toward said beam window, the shield also having a shaft receiving bore, the bore having an axis aligned with the shutter cavity axis and radial with respect to said shield axis, a shutter shaft journaled in the bore, a shutter wheel carried by the shutter shaft and disposed within the shutter cavity, the wheel including an eccentrically disposed radio-active material receiving void adjacent the periphery thereof, said mechanism having exposure and storage positions, said void being adjacent and in radiant energy transmitting communication with said window when in the exposure position, said void being at substantially the geometric center of said shield when in the storage position, said shaft and wheel being rotated substantially about 180 degrees from one position to the other, drive means operably connected to said shaft to cause said shaft to rotate, remotely controllable operator actuated means operably connected to said drive means for the selective actuation of the latter, and said mechanism including operator actuatable override means operably connectable to said shaft to rotate the shaft and the wheel from the exposure to the storage position.

15. The device of claim 14 wherein said drive means is unidirectional and wherein the operator control override means selectively rotates the shaft in a reverse direction.

16. In a radiant energy camera having a rotatable shutter wheel carrying a quantity of radioactive material, an energy retaining drive means connected to the shutter, and control means to release the drive means, the improvement which comprises, a solenoid mechanically connected to the control means, a battery series connected to the solenoid, and a switching circuit series connected to the battery and solenoid to complete the battery-solenoid circuit, said switching circuit comprising, a pair of single pole double throw switches in series with one another, one of said pair of switches being a timer switch, the other of said pair of switches being a condition control switch, and a third single pole double throw switch in series with said other switch and having one side series connected to one side of said one switch and the other side parallel connected to the other side of said one switch.

17. The device of claim 16 wherein an on-and-off switch is series connected to said single pole double throw switches.

18. The device of claim 16 wherein said pair of single pole double throw switches have an exposure side and a storage side and wherein a normally open micro-switch is series connected with the exposure side.

19. The device of claim 16 wherein a pair of parallel connected test lamps are series connected to said battery and parallel connected to said switch circuit and wherein a single pole double throw switch is in series with said test lamps and battery to close said test lamp circuits one at a time, and wherein normally open push to test means are provided to maintain said test lamps in a de-energized position unless at least one of said test means is closed to energize one of said test lamps.

20. A shielding mechanism for a radiant energy camera comprising a frame structure, a sectioned shield carried by the frame, the shield having a center portion and spaced oppositely tapered portions on either side of the center portion, the frame including first and second relatively movable apertured plates, each of the plates being positioned around one of said tapered surfaces, clamping means to urge said plates toward one another to cam the shield sections against one another and form a closed shield, said shield having a shutter cavity for a shutter wheel formed therein and disposed symmetrically about the axis of the shield, the shield also including a ray energy window extending from the cavity to the exterior of the shield, the shutter cavity being offset with respect to the longitudinal midpoint of the shield toward said beam window, and the shield also having a shaft receiving bore for a shutter shaft.

21. A shielding structure for a radiant energy camera comprising a frame structure, a sectioned shield carried by the frame, the shield having a generally cylindrical center portion and spaced oppositely tapered portions on either side of the center portion, the frame including first and second relatively movable apertured plates, each of the plates being positioned around one of said tapered surfaces, clamping means to urge said plates toward one another to cam the shield sections against one another and form a closed shield, said shield having a cylindrically contoured shutter cavity for a shutter wheel formed therein and disposed symmetrically about the axis of the shield, the shield also including a ray energy window disposed around the shield axis at one end of the shield, the shutter cavity being offset with respect to the longitudinal midpoint of the shield toward said beam window, and the shield also having a shaft receiving bore for a shutter shaft, the bore having an axis aligned with the shutter cavity axis and radial with respect to said shield axis.

22. A radiant energy camera comprising a frame structure, shield means carried by the frame, said shield means having a shutter cavity formed therein, the shield means also including a ray energy window extending from the shutter cavity to the exterior of the shield means, the shutter cavity being offset with respect to the longitudinal midpoint of the shield toward said beam window, the shield means also having a shaft receiving bore, a shutter shaft journaled in the bore, a shutter wheel carried by the shutter shaft and disposed within the shutter cavity, the wheel including an eccentrically disposed radioactive material receiving void adjacent the periphery thereof, said mechanism having exposure and storage positions, said void being adjacent and in radiant energy transmitting communication with said window when in the exposure position, said void being at substantially the geometric center of said shield when in the storage position, said shaft and wheel being rotated substantially about 180 degrees from one position to the other, drive means operably connected to said shaft to cause said shaft to rotate, remotely controllable operator actuated means operably connected to said drive means for the selective actuation of the latter, and said mechanism including operator actuatable override means operably connectable to said shaft to rotate the shaft and the wheel from the exposure to the storage position.

23. In a radiant energy camera having a rotatable shutter wheel carrying a quantity of radioactive material, an energy retaining drive means connected to the shutter, and control means to release the drive means, the improvement which comprises, a solenoid mechanically connected to the control means, a source of electric potential series connected to the solenoid, and a switching circuit series connected to the potential source and solenoid to complete the potential source-solenoid circuit, said switching circuit comprising, a pair of switches in series with one another, one of said pair of switches being a timer switch, the other of said pair of switches being condition control switch, and a third switch in series with said other switch and having one side series connected to one side of said one switch and the other side parallel connected to the other side of said one switch.

24. In a radioactive material camera the combination of a shield including a shutter wheel cavity and a ray transmitting window communicating with the cavity, a bore communicating with the cavity and disposed transversely of the window, a shutter wheel in the cavity, a first shaft connecting to the wheel, a drive spring connected to the shield and to the first shaft to cause rotation of the first shaft and wheel, positioning means forming a releasable connection between the shield and the first shaft to selectively hold the first shaft in the storage and exposure positions one at a time, a second shaft connected to the spring, manually actuatable means connected to the second shaft and causing the second shaft to rotate and wind the spring when the manual means is rotated, and one of said shaft-to-spring connections including releasable means to permit the manual means to wind said spring while the shutter wheel is maintained in one of its positions.

25. In a radiant energy device having a shield and a source wheel in a cavity in the shield, the combination of,
 (a) a shaft secured to the wheel and journaled in the shield;
 (b) said shaft being formed of a material of high tensile strength;
 (c) said shaft having a bottomed bore extending from an end adjacent to the shield wheel outwardly toward the exterior of the shield; and,
 (d) said bore being substantially filled with a shielding material of high resistance to the passage of radiant energy.

26. A radiant energy device comprising;
 (a) a shield having a cavity therein;
 (b) said shield including a bore extending from the cavity outwardly;
 (c) a shaft journaled in the bore and projecting outwardly past an external surface of the shield;
 (d) said shaft having an inner end;
 (e) a source wheel disposed within the cavity and secured to the inner end of the shaft;
 (f) said shaft being formed of a material having a high tensile strength; and,
 (g) said shaft including a bottomed bore extending from said inner end outwardly, said bore being substantially filled with a shielding material of high resistance to the passage of radiant energy.

27. The device of claim 26 wherein the portion of the shaft journaled in the shield bore is cylindrically contoured, wherein said bottomed bore is cylindrically contoured, and wherein the shaft outwardly of said bottomed bore is solid.

References Cited in the file of this patent
UNITED STATES PATENTS

| | | |
|---|---|---|
| 2,719,926 | Procter et al. | Oct. 4, 1955 |
| 2,872,587 | Stein | Feb. 3, 1959 |
| 2,876,363 | Forrer et al. | Mar. 3, 1959 |
| 2,891,168 | Goertz et al. | June 16, 1959 |
| 2,962,591 | McNabb et al. | Nov. 29, 1960 |
| 2,973,435 | Reeder | Feb. 28, 1961 |